(12) United States Patent
Stinebring et al.

(10) Patent No.: US 9,643,641 B1
(45) Date of Patent: May 9, 2017

(54) TUNABLE STEERING COLUMN ENERGY ABSORPTION SYSTEM

(71) Applicant: STEERING SOLUTIONS IP HOLDING CORPORATION, Saginaw, MI (US)

(72) Inventors: Scott A. Stinebring, Auburn, MI (US); Robert D. Maida, Pinconning, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/924,775

(22) Filed: Oct. 28, 2015

(51) Int. Cl.
*B62D 1/16* (2006.01)
*B62D 1/19* (2006.01)

(52) U.S. Cl.
CPC .................... *B62D 1/195* (2013.01)

(58) Field of Classification Search
CPC ............... F16F 7/123; B62D 1/195
USPC ................... 74/492, 493
See application file for complete search history.

(56) References Cited

U.S. PATENT DOCUMENTS

| | | | | |
|---|---|---|---|---|
| 4,989,898 A * | 2/1991 | Yamaguchi | ............ | B62D 1/195 280/777 |
| 5,820,163 A * | 10/1998 | Thacker | ................. | B62D 1/184 280/775 |
| 6,575,497 B1 * | 6/2003 | McCarthy | ............... | F16F 7/128 280/777 |
| 7,188,867 B2 * | 3/2007 | Gatti | ....................... | F16F 7/123 280/777 |
| 7,264,274 B2 * | 9/2007 | Ridgway | ................. | F16F 7/127 188/376 |
| 7,896,395 B2 * | 3/2011 | Cymbal | .................. | B62D 1/195 280/777 |
| 9,302,696 B2 * | 4/2016 | Buzzard | .................. | F16F 7/128 |
| 2004/0232685 A1 * | 11/2004 | Gatti | ....................... | F16F 7/123 280/777 |
| 2006/0226646 A1 * | 10/2006 | Armstrong | ............. | B62D 1/195 280/777 |
| 2006/0273568 A1 * | 12/2006 | Manwaring | ............ | B62D 1/195 280/777 |
| 2014/0251059 A1 * | 9/2014 | Russell | .................. | B62D 1/195 74/492 |
| 2015/0128752 A1 * | 5/2015 | Buzzard | .................. | F16F 7/128 74/493 |

* cited by examiner

*Primary Examiner* — Toan To
(74) *Attorney, Agent, or Firm* — Cantor Colburn LLP

(57) ABSTRACT

A steering column assembly includes an upper jacket assembly received within a lower jacket assembly and an energy absorption strap. The energy absorption strap has a first portion that defines a first slot that receives a first fastener to couple the first portion to a telescope drive bracket disposed on the upper jacket assembly. A second portion defines a second opening that receives a second fastener to couple the second portion to the upper jacket assembly.

19 Claims, 4 Drawing Sheets

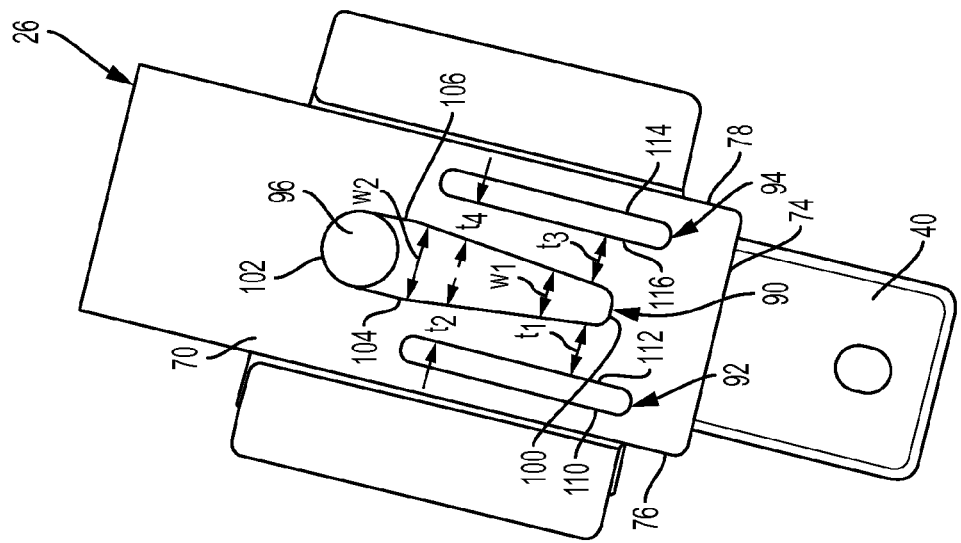
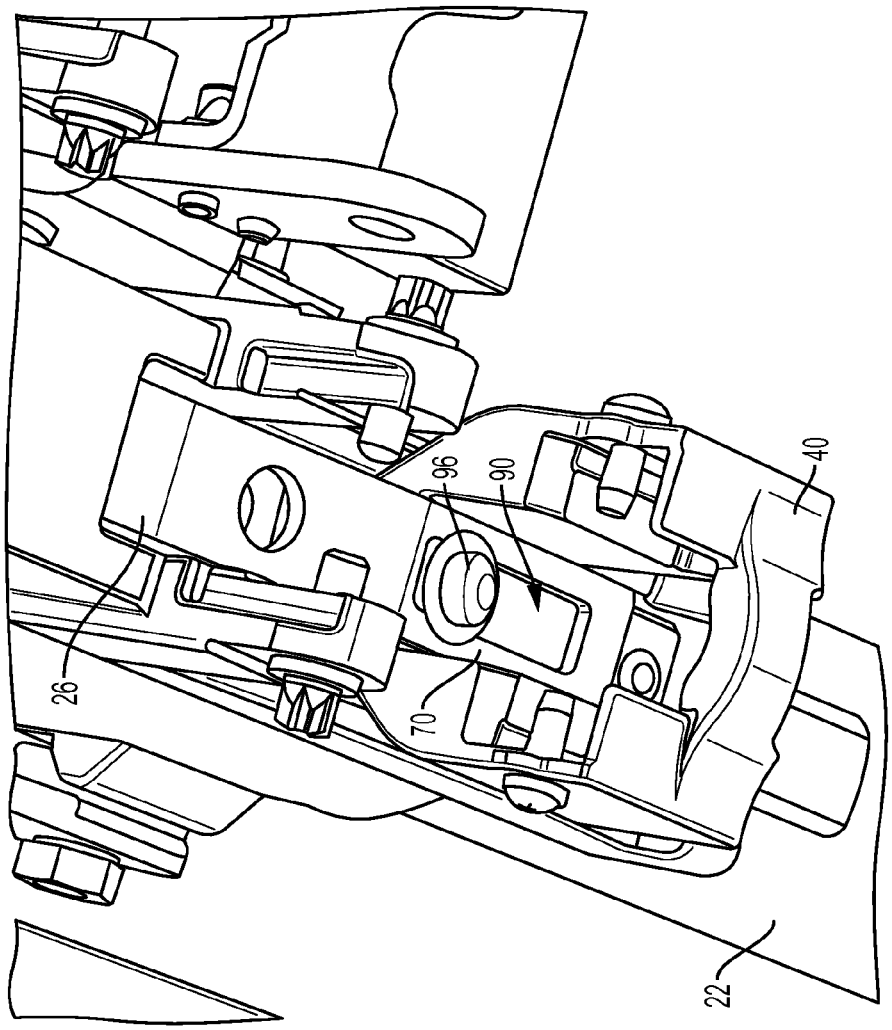

TUNABLE STEERING COLUMN ENERGY ABSORPTION SYSTEM

BACKGROUND OF THE INVENTION

The present disclosure relates to a telescoping tunable steering column energy absorption system.

Telescopically adjustable steering column of a vehicle includes a telescope actuator and column jacket having lower and upper jackets. The column jacket is longitudinally moveable and internally collapsible along a longitudinal axis between a "full out" position in which the column jacket is fully extended and a "full in" position in which the column jacket is fully retracted. The telescopically adjustable steering column may collapse during an impact event event to absorb energy regardless of the position of the column jacket. This collapsibility is energy-absorbing (E/A) and reduces the likelihood of injury to a driver of the vehicle during an impact event.

SUMMARY OF THE INVENTION

In at least one embodiment of the present disclosure, a steering column assembly includes a lower jacket assembly, and upper jacket assembly, a telescope drive bracket, the telescope actuator, and an energy absorption strap. The upper jacket assembly is at least partially received within the lower jacket assembly and is extendable along the steering column axis relative to the lower jacket assembly. The telescope drive bracket is coupled to the upper jacket assembly. The telescope actuator is coupled to the lower jacket assembly and operatively connected to the telescope drive bracket and is configured to translate the upper jacket assembly relative to the lower jacket assembly via a lead screw. The energy absorption strap includes a first portion and a second portion. The first portion defines a first slot that receives a first fastener to couple the first portion to the telescope drive bracket. The second portion defines a second opening that receives a second fastener to couple the second portion to the upper jacket assembly.

In at least one embodiment of the present disclosure, a steering column assembly includes an upper jacket assembly received within a lower jacket assembly and an energy absorption strap. The energy absorption strap has a first portion and a second portion. The first portion defines a first slot that receives a first fastener to couple the first portion to a telescope drive bracket disposed on the upper jacket assembly. The second portion defines a second opening that receives a second fastener to couple the second portion to the upper jacket assembly.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 is a perspective view of an energy absorption strap prior to a steering column collapse event;

FIG. 4 is a perspective view of a portion of the energy absorption strap;

DETAILED DESCRIPTION

Referring now to the Figures, where the invention will be described with reference to specific embodiments, without limiting same, it is to be understood that the disclosed embodiments are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
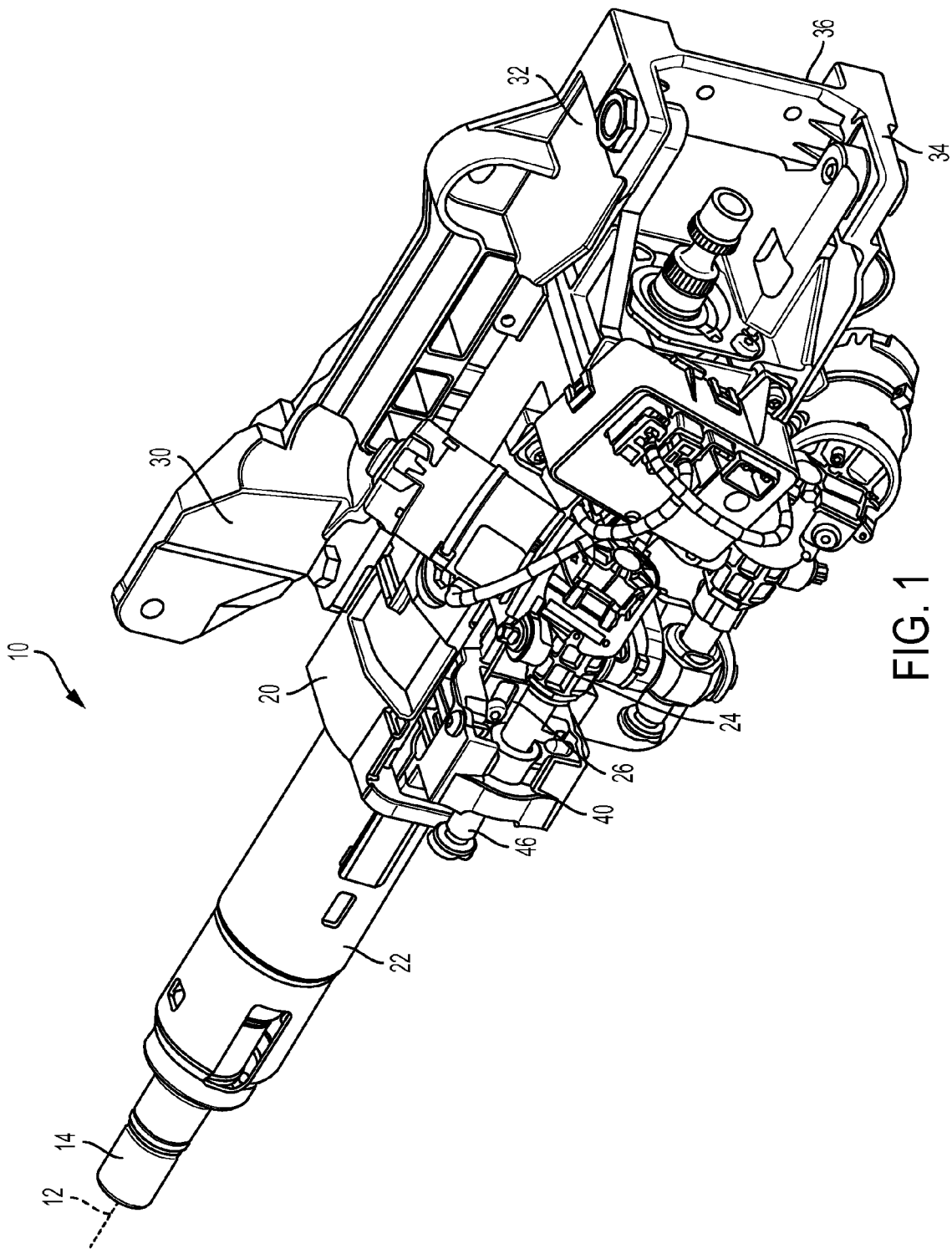
FIG. 1 is a perspective view of a steering column assembly in an extended or non-collapsed position.

Referring to FIG. 1 an exemplary steering column assembly 10 is shown. The steering column assembly 10 extends along a steering column axis 12. The steering column assembly 10 is an adjustable telescopic steering column assembly. A steering shaft 14 extends through the steering column assembly 10 along the steering column axis 12. The steering column assembly 10 includes a lower jacket assembly 20, an upper jacket assembly 22, a telescope actuator assembly 24, and an energy absorption strap 26.

The lower jacket assembly 20 extends along the steering column axis 12. The lower jacket assembly 20 may define an inner bore that receives at least a portion of the upper jacket assembly 22. The lower jacket assembly 20 is operatively connected to a vehicle structure by a mounting bracket 30. Throughout this specification, the term "attach," "attachment," "connected", "coupled," "coupling," "mount," or "mounting" shall be interpreted to mean that one structural component or element is in some manner connected to or contacts another element—either directly or indirectly through at least one intervening structural element—or is integrally formed with the other structural element. Accordingly, it should be appreciated that the lower jacket assembly 20 may be connected to the mounting bracket 30 in several different ways using at least one different structural element interconnecting the lower jacket assembly 20 and the mounting bracket 30 to each other.

The mounting bracket 30 is configured as a rake bracket to adjust the pitch or rake of the lower jacket assembly 20 and the upper jacket assembly 22. The mounting bracket 30 includes a first plate 32, a second plate 34, and a third plate 36. The first plate 32 is disposed opposite the second plate 34. The third plate 36 extends between upper portions of the first plate 32 and the second plate 34.

The upper jacket assembly 22 extends longitudinally along the steering column axis 12. The upper jacket assembly 22 is telescopically or slidably received within the lower jacket assembly 20. The lower jacket assembly 20 and/or the upper jacket assembly 22 are extendable along the steering column axis 12 with respect to each other. The telescope actuator assembly 24 is configured to translate the upper jacket assembly 22 relative to the lower jacket assembly 20.

Figure 2:
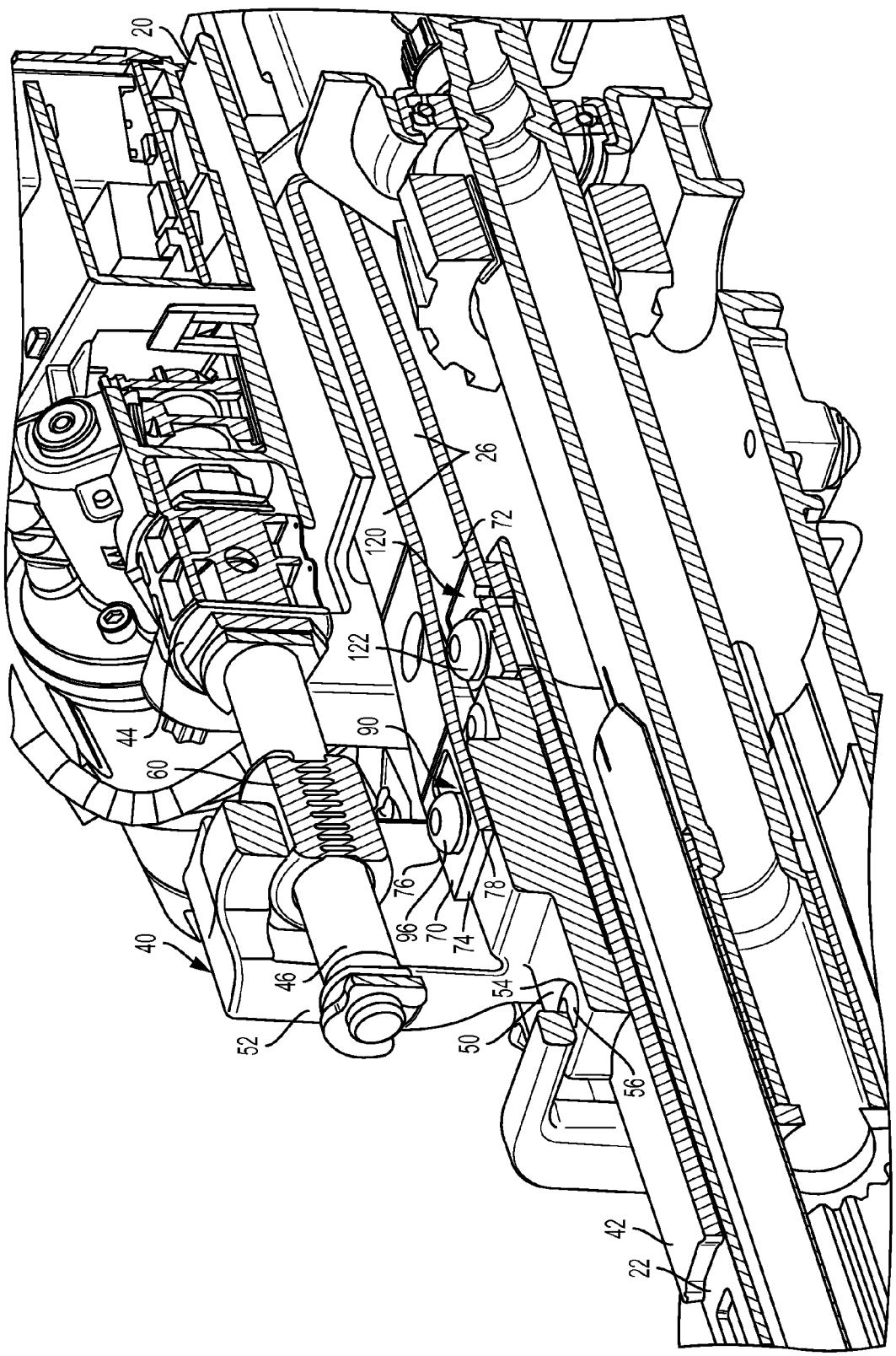
FIG. 2 is a partial cross-sectional view of the steering column assembly prior to a collapse event.

Referring to FIGS. 1 and 2, the telescope actuator assembly 24 includes a telescope drive bracket 40, a mounting plate 42, a telescope actuator 44, and a lead screw 46. The telescope drive bracket 40 is coupled to the upper jacket assembly 22 via the mounting plate 42 disposed between the telescope drive bracket 40 and the upper jacket assembly 22. The telescope drive bracket 40 extends generally away from the steering column axis 12. The mounting plate 42 is mounted to the steering column assembly by any appropriate method, such as fastening, welding, or other joining method.

The telescope drive bracket 40 defines a base portion 50 disposed proximate the upper jacket assembly 22 and a body portion 52 extending away from the base portion 50. The base portion 50 defines at least one base opening 54 configured to receive at least one shear fastener 56, for example a shear rivet or the like, to couple the telescope drive bracket 40 to the upper jacket assembly 22. During a steering column collapse event that may occur as a result of a vehicle frontal impact event, the telescope drive bracket 40 causes the at least one shear fastener 56 to shear, subsequently the telescope actuator 44 may hold the telescope drive bracket 40 substantially stationary to the steering column structure to initiate the energy absorption process.

The body portion 52 defines an opening or an aperture extending completely through the body portion 52. The aperture is disposed substantially parallel to and spaced apart from the steering column axis 12. The body portion 52 includes a jackscrew nut 60 disposed within the aperture.

The telescope actuator 44 is spaced apart from the telescope drive bracket 40. The telescope actuator 44 is disposed on the lower jacket assembly 20. The telescope actuator 44 is operatively connected to the telescope drive bracket 40 via the lead screw 46. The lead screw 46 extends from the telescope actuator 44 through the aperture of the telescope drive bracket 40 and engages the jackscrew nut 60 to interconnect the telescope drive bracket 40 and the telescope actuator 44. The telescope actuator 44 imparts rotary motion to the lead screw 46 and the telescope drive bracket 40 converts the rotary motion into linear motion to translate the upper jacket assembly 22 along the steering column axis 12 relative to the lower jacket assembly 20. The telescope actuator 44 may be electronic, hydraulic, pneumatic actuator, or the like.

The energy absorption strap 26 extends between the lower jacket assembly 20 and the upper jacket assembly 22. The energy absorption strap 26 translates with upper jacket assembly 22 during operation of the telescope actuator assembly 24 to adjust the position of the upper jacket assembly 22 relative to the lower jacket assembly 20. The energy absorption strap 26 is configured to provide a drag load or force opposing stroking or translation of the upper jacket assembly 22 relative to the lower jacket assembly 20 to decelerate the steering column assembly 10 during a collapse event. The drag load or force opposing stroking of the upper jacket assembly 22 relative to the lower jacket assembly 20 is adaptive or variable based on the loads encountered during the collapse event and the configuration of the energy absorption strap 26.

Referring to FIGS. 2-4, the energy absorption strap 26 includes a first portion 70 and a second portion 72. The first portion 70 is disposed proximate a first end of the lower jacket assembly 20. The first portion 70 includes a first end surface 74 that extends between a first edge 76 and a second edge 78. The first portion 70 defines a first slot 90, a second slot 92, and a third slot 94.

The first slot 90 may be completely defined by or bound within the energy absorption strap 26 and is spaced apart from the first end surface 74, the first edge 76, and the second edge 78. The first slot 90 is configured as a through hole that extends completely through the first portion 70 of the energy absorption strap 26. The first slot 90 is configured to receive a first fastener 96 that couples the first portion 70 of the energy absorption strap 26 to the telescope drive bracket 40. The first fastener 96 may be a retaining screw or the like.

The first slot 90 includes a first end 100, a second end 102, a first side 104, and a second side 106. The second end 102 is disposed opposite the first end 100. The second end 102 has an arcuate shape such that the first slot 90 has a keyhole shape. Other shapes of the first slot 90 are contemplated, such as a zipper configuration, locking tab, or other shapes that may tune or vary the production of the drag load or opposing force. The first side 104 extends between the first end 100 and the second end 102. The second side 106 is disposed opposite the first side 104 and extends between the first end 100 and the second end 102. The first side 104 is disposed in a non-parallel relationship to the second side 106. The first side 104 and the second side 106 extend generally away or diverge from each other in a direction that extends away from the first end 100 towards the second end 102.

The first slot 90 has a first width, w1, extending from the first side 104 to the second side 106 proximate the first end 100. The first slot 90 has a second width, w2, extending from the first side 104 to the second side 106 proximate the second end 102. The second width, w2, is greater than the first width, w1.

The second slot 92 is disposed between the first side 104 of the first slot 90 and the first edge 76 of the energy absorption strap 26. The second slot 92 is a generally elongate slot having a second slot first wall 110 disposed opposite a second slot second wall 112. The second slot first wall 110 is disposed substantially parallel to the second slot second wall 112. The second slot second wall 112 is disposed in a non-parallel relationship with the first side 104.

The first portion 70 of the energy absorption strap 26 has a first thickness, t1, extending from the second slot second wall 112 to the first side 104 proximate the first end 100. The first portion 70 of the energy absorption strap 26 has a second thickness, t2, extending from the second slot second wall 112 to the first side 104 proximate the second end 102. The first thickness, t1, being greater than the second thickness, t2.

The third slot 94 is disposed between the second side 106 of the first slot 90 and the second edge 78 of the energy absorption strap 26. The third slot 94 is a generally elongate slot having a third slot first wall 114 disposed opposite a third slot second wall 116. The third slot first wall 114 is disposed substantially parallel to the third slot second wall 116. The third slot second wall 116 is disposed in a non-parallel relationship with the second side 106.

The first portion 70 of the energy absorption strap 26 has a third thickness, t3, extending from the third slot second wall 116 to the second side 106 proximate the first end 100. The first portion 70 of the energy absorption strap 26 has a fourth thickness, t4, extending from the third slot second wall 116 to the second side 106 proximate the second end 102. The third thickness, t3, being greater than the fourth thickness, t4.

Referring back to FIG. 2, the second portion 72 is disposed opposite the first portion 70 and generally orthogonal to the column axis 12. The second portion 72 defines a second opening 120. The second opening 120 is configured to receive a second fastener 122 that couples the second portion 72 to the upper jacket assembly 22. The second portion 72 is disposed substantially parallel to but not coplanar with the first portion 70.

The steering column assembly 10 is configured to collapse during a steering column collapse event such as a frontal vehicle impact event. The steering column collapse event results in the upper jacket assembly 22 translating relative to the lower jacket assembly 20 along the steering column axis 12. The steering column collapse event may be categorized into high load collapse events and low load collapse events. The high load collapse events are events in which a larger operator of the vehicle may apply a high load to the steering column assembly 10 during the steering column collapse event. The low load collapse events are events in which a smaller operator of the vehicle may apply a low load to the steering column assembly 10 during the steering column collapse event. In some steering column assemblies, the steering column may be provided with distinct portions or components to decelerate the steering column assembly during a high load collapse events and low load collapse events. However, such steering column assemblies may have a sharp transition between the drag load or opposing force produced by an energy absorption system. The arrangement of the energy absorption strap 26 and at least one of the first slot 90, the second slot 92, and the third slot 94 with the first fastener 96 provides for a smoother transition between the production of the drag load or the opposing force as the steering column collapse event transitions from the low load event to the high load event.

Referring to FIGS. 5A-7B, perspective and bottom views of the system response prior to a steering column collapse event, during a steering column collapse event, and following a steering column collapse event in which the collapse event transitions from a low load collapse event to a high load collapse event.

Figure 5A:
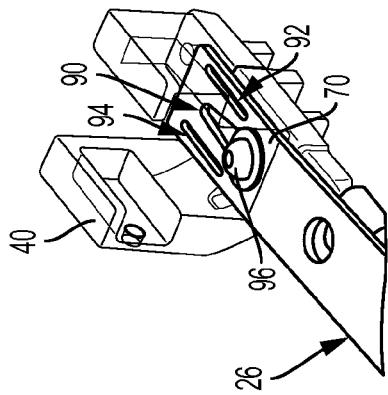
FIGS. 5A and 5B are perspective and bottom views of the energy absorption strap prior to a steering column collapse event.
Figure 5B:
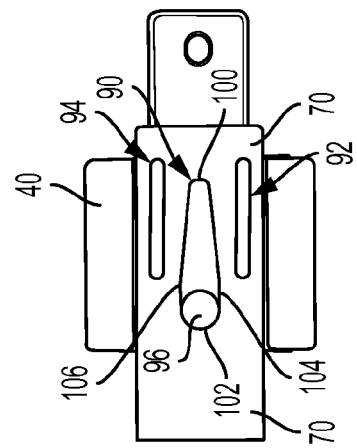

Referring to FIGS. 5A and 5B, prior to a steering column collapse event, the first fastener 96 is disposed proximate the second end 102 of the first slot 90 of the energy absorption strap 26. After the at least one shear fastener 56 shears, the first fastener 96 may begin to translate along a length of the first slot 90 from the second end 102 towards the first end 100.

Figure 6A:
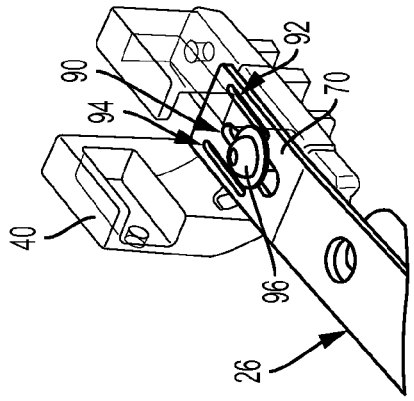
FIGS. 6A and 6B are perspective and bottom views of the energy absorption strap during a steering column collapse event.
Figure 6B:
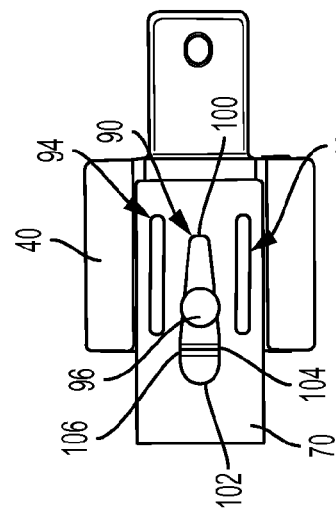

Referring to FIGS. 6A and 6B, during the steering column collapse event, the first portion 70 of the energy absorption strap 26 moves relative to the first fastener 96 and relative to the second portion 72 of the energy absorption strap 26. The relative movement of the first portion 70 of the energy absorption strap 26 causes the first fastener 96 to slidingly engage at least one of the first side 104 and the second side 106 of the first slot 90. The sliding engagement between the first fastener 96 and at least one of the first side 104 and the second side 106 of the first slot 90 causes the first fastener 96 to deform at least one of the first side 104 and the second side 106 to produce a drag load or opposing force to decelerate the collapsing of the steering column assembly 10. The deformation leads to an increase in the energy absorption load. The energy absorption load may progressively increase as the first fastener 96 becomes progressively closer to the first end 100. The variation of the geometry of the first slot 90 may tune or provide varying energy absorption loads based on system safety requirements for the vehicle. While the first slot 90 is generally shown having a keyhole shape, other shapes are also contemplated.

Figure 7A:
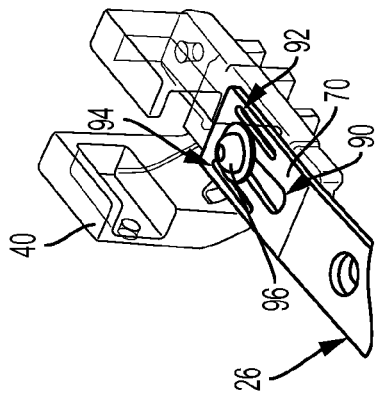
FIGS. 7A and 7B are perspective and bottom views of the energy absorption strap after a steering column collapse event.
Figure 7B:
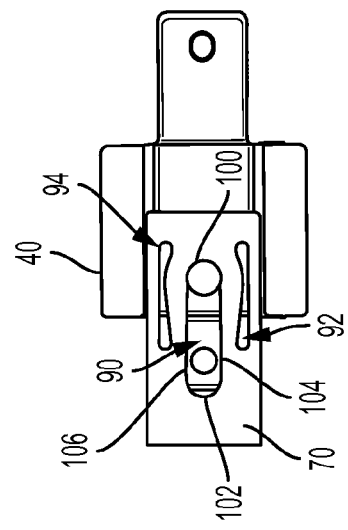

Referring to FIGS. 7A and 7B, immediately prior to the completion of the transition of the steering column collapse event from the low load collapse event to the high load collapse event, the first fastener 96 engages the first end 100 or bottoms out against the first end 100 of the first slot 90. The complete traversing of the first fastener 96 from the second end 102 to the first end 100 results in the first width, w1, becoming substantially similar to the second width, w2. The relative movement of the first portion 70 of the energy absorption strap 26 causes the first fastener 96 to slidingly engage at least one of the first side 104 and the second side 106 of the first slot 90.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
    a lower jacket assembly, extending along a steering column axis;
    an upper jacket assembly at least partially received within the lower jacket assembly, the upper jacket assembly extendable along the steering column axis relative to the lower jacket assembly;
    a telescope drive bracket coupled to the upper jacket assembly;
    a telescope actuator coupled to the lower jacket assembly and operatively connected to the telescope drive bracket, configured to translate the upper jacket assembly relative to the lower jacket assembly via a lead screw; and
    an energy absorption strap having a first portion defining a first slot that receives a first fastener to couple the first portion to the telescope drive bracket and a second portion defining a second opening that receives a second fastener to couple the second portion to the upper jacket assembly.

2. The steering column assembly of claim 1, wherein the first slot includes a first end, a second end disposed opposite the first end, a first side extending between the first end and the second end, and a second side disposed opposite the first side and extending between the first end and the second end.

3. The steering column assembly of claim 2, wherein the first side and the second side generally extend away from each other in a direction away from the first end towards the second end.

4. The steering column assembly of claim 3, wherein the first slot has a first width disposed proximate the first end and has a second width disposed proximate the second end, the second width is greater than the first width.

5. The steering column assembly of claim 3, wherein prior to a steering column collapse event the first fastener is disposed proximate the second end.

6. The steering column assembly of claim 5, wherein during the steering column collapse event the first portion of the energy absorption strap moves relative to the first fastener and relative to the second portion of the energy absorption strap, such that the first fastener is disposed proximate the first end.

7. The steering column assembly of claim 6, wherein the first fastener engages at least one of the first side and the second side while the first portion of the energy absorption strap moves relative to the first fastener and relative to the second portion of the energy absorption strap.

8. The steering column assembly of claim 6 wherein the first fastener deforms at least one of the first side and the second side as the first portion of the energy absorption strap moves relative to the first fastener and relative to the second portion of the energy absorption strap.

9. A steering column assembly, comprising:
an upper jacket assembly received within a lower jacket assembly; and
an energy absorption strap having a first portion defining a first slot that receives a first fastener to couple the first portion to a telescope drive bracket disposed on the upper jacket assembly and a second portion defining a second opening that receives a second fastener to couple the second portion to the upper jacket assembly, the first slot has a first end, a second end disposed opposite the first end, a first side extending between the first end and the second end, and a second side disposed opposite the first side and extending between the first end and the second end.

10. The steering column assembly of claim 9 wherein the first portion further defines a second slot disposed between the first side and a first edge of the energy absorption strap.

11. The steering column assembly of claim 10 wherein the second slot has a second slot first wall disposed opposite a second slot second wall.

12. The steering column assembly of claim 11 wherein the first portion further defines a third slot disposed between the second side and a second edge of the energy absorption strap.

13. The steering column assembly of claim 12 wherein the third slot has a third slot first wall disposed opposite a third slot second wall.

14. The steering column assembly of claim 13 wherein the first portion of the energy absorption strap has a first thickness extending from the second slot second wall to the first side proximate the first end and has a second thickness different from the first thickness, the second thickness extending from the second slot second wall to the first side proximate the second end.

15. The steering column assembly of claim 14 wherein the first thickness is greater than the second thickness.

16. The steering column assembly of claim 14 wherein the first side is disposed in a non-parallel relationship with the second slot second wall.

17. The steering column assembly of claim 14 wherein the second side is disposed in a non-parallel relationship with the third slot second wall.

18. A steering column assembly, comprising:
an upper jacket assembly received within a lower jacket assembly; and
an energy absorption strap having a first portion defining a first slot having a first end disposed opposite the second end, the first slot receives a first fastener to couple the first portion to a telescope drive bracket disposed on the upper jacket assembly and a second portion defining a second opening that receives a second fastener to couple the second portion to the upper jacket assembly, the first slot has a first width disposed proximate the first end and has a second width disposed proximate the second end, the second width being greater than the first width.

19. A steering column assembly, comprising:
an upper jacket assembly received within a lower jacket assembly;
a telescope actuator coupled to the lower jacket assembly and connected to a telescope drive bracket disposed on the upper jacket assembly, configured to translate the upper jacket assembly relative to the lower jacket assembly; and
an energy absorption strap having a first portion defining a first slot having a first end disposed opposite the second end, the first slot receives a first fastener to couple the first portion the telescope drive bracket and a second portion defining a second opening that receives a second fastener to couple the second portion to the upper jacket assembly.

* * * * *